(12) United States Patent
Grundström et al.

(10) Patent No.: US 12,202,119 B2
(45) Date of Patent: Jan. 21, 2025

(54) HAND TOOL AND A MANUFACTURING METHOD FOR A HAND TOOL

(71) Applicant: Fiskars Finland Oy Ab, Helsinki (FI)

(72) Inventors: Andreas Grundström, Kaunislahti (FI); Mikko Kemppi, Pusula (FI); Henrik Lund, Helsinki (FI); Jouni Riikonen, Snappertuna (FI); Petteri Masalin, Helsinki (FI); Juha Huhtala, Karjaa (FI)

(73) Assignee: Fiskars Finland Oy Ab, Helsinki (FI)

( * ) Notice: Subject to any disclaimer, the term of this patent is extended or adjusted under 35 U.S.C. 154(b) by 1264 days.

(21) Appl. No.: 16/553,777

(22) Filed: Aug. 28, 2019

(65) Prior Publication Data

US 2020/0078927 A1  Mar. 12, 2020

(30) Foreign Application Priority Data

Sep. 6, 2018 (EP) ..................................... 18192929

(51) Int. Cl.
*B25G 3/34* (2006.01)
*B26B 23/00* (2006.01)
(Continued)

(52) U.S. Cl.
CPC .......... *B25G 3/34* (2013.01); *B29C 45/14467* (2013.01); *B26B 23/00* (2013.01); *B29K 2711/14* (2013.01); *B29L 2031/283* (2013.01)

(58) Field of Classification Search
CPC .............. B25G 1/00; B25G 1/10; B25G 3/00; B25G 3/34; B26B 23/00; B29C 45/14467; B29K 2711/14; B29L 2031/283
(Continued)

(56) References Cited

U.S. PATENT DOCUMENTS 2,737,216 A * 3/1956 Kenerson ................. B25D 1/12
 81/22
3,088,506 A * 5/1963 Bianchini ................ B25D 1/12
 81/19
(Continued)

FOREIGN PATENT DOCUMENTS

CN 102348540 A 2/2012
CN 102361730 A 2/2012
(Continued)

OTHER PUBLICATIONS

English Translation of Office Action for Russian Application No. 2014144138/02(071559), dated Jun. 1, 2018, 5 pages.
(Continued)

*Primary Examiner* — Brian D Keller
*Assistant Examiner* — Alberto Saenz
(74) *Attorney, Agent, or Firm* — FOLEY & LARDNER LLP

(57) ABSTRACT

The present invention relates to a hand tool, comprising a tool member, of a first material, an elongated shaft, of a second material and a connecting member, of a third material comprising plastic. The elongated shaft further comprises a handle portion in a first end and an insert portion in a second end. The hand tool further comprises a sealing ring arranged to surround the insert portion to prevent leakage of the third material during manufacturing. A manufacturing method for such a hand tool is also presented, said method comprising arranging a sealing ring around an insert portion, arranging the insert portion and a tool member in a mold, injecting material comprising plastic in a cavity space so as to form a connecting member and removing the hand tool from the mold.

13 Claims, 5 Drawing Sheets

(51) Int. Cl.
*B29C 45/14* (2006.01)
*B29K 711/14* (2006.01)
*B29L 31/28* (2006.01)

(58) Field of Classification Search
USPC .................. 81/20, 489; 7/145, 158, 159
See application file for complete search history.

(56) References Cited

U.S. PATENT DOCUMENTS

| | | | |
|---|---|---|---|
| 3,870,091 A | 3/1975 | Burgeson | |
| 3,874,433 A * | 4/1975 | Shepherd, Jr. | B25G 3/34 |
| | | | 81/22 |
| 3,962,399 A * | 6/1976 | Shepherd, Jr. | B25D 1/045 |
| | | | 264/261 |
| 4,418,732 A * | 12/1983 | Kolonia | B25G 3/34 |
| | | | 81/489 |
| 5,155,878 A | 10/1992 | Dellis | |
| 5,259,274 A | 11/1993 | Hreha | |
| 5,261,665 A | 11/1993 | Downey | |
| 5,425,176 A | 6/1995 | Brainerd et al. | |
| 5,511,445 A | 4/1996 | Hildebrandt | |
| 6,131,972 A | 10/2000 | Whitehead et al. | |
| 6,311,369 B1 | 11/2001 | Ryu | |
| 6,347,562 B1 * | 2/2002 | Gerber, Jr. | B25D 1/02 |
| | | | 81/25 |
| 6,652,398 B2 | 11/2003 | Falone et al. | |
| 6,889,405 B2 | 5/2005 | Ritrovato et al. | |
| 7,448,299 B1 | 11/2008 | Chen | |
| 8,420,203 B2 | 4/2013 | Sikora et al. | |
| 2004/0043181 A1 | 3/2004 | Sherwood | |
| 2015/0143959 A1* | 5/2015 | Lin | B25G 1/02 |
| | | | 81/22 |

FOREIGN PATENT DOCUMENTS

| | | |
|---|---|---|
| DE | 87 16 099 U1 | 1/1988 |
| DE | 19945872 | 4/2001 |
| DE | 10 2009 015 432 A1 | 9/2010 |
| EP | 2 407 280 A1 | 1/2012 |
| EP | 2 743 037 A2 | 6/2014 |
| GB | 1 327 222 | 8/1973 |
| GB | 2 185 209 | 7/1987 |
| GB | 2 264 062 | 8/1993 |
| GB | 2 542 615 | 3/2017 |
| TW | 201039989 A1 | 11/2010 |
| WO | WO-93/04858 A1 | 3/1993 |
| WO | WO-03/041817 A1 | 5/2003 |
| WO | WO-2004/018163 A1 | 3/2004 |
| WO | WO-2006/081842 A1 | 8/2006 |

OTHER PUBLICATIONS

English-language translation of Chinese Office Action, App. No. 201410610253.0, 10 pages (Oct. 24, 2017).

English-language translation of Taiwan Search Report, App. No. 103138062, 1 page (Dec. 20, 2017).

Search Report for European Application No. 18192929.0, Mar. 22, 2019, 2 pages.

Search Report for European Patent Application No. EP 13 19 1364, dated Apr. 24, 2014, 4 pages.

English Translation of Office Action Received for Chinese Application No. 201910841762.7, mail date May 8, 2021, 7 pages.

* cited by examiner

HAND TOOL AND A MANUFACTURING METHOD FOR A HAND TOOL

CROSS-REFERENCE TO RELATED APPLICATION

This application claims the benefit of and priority to European Application No. 18192929.0, filed Sep. 6, 2018, the content of which is hereby incorporated by reference in its entirety.

FIELD OF THE INVENTION

The present invention relates to a hand tool and to manufacturing method for a hand tool.

DESCRIPTION OF PRIOR ART

A hand tool with a handle comprising plastic material is known in the prior art. For the user, however, a handle comprising natural material is more comfortable to use. One of the problems associated with handles made of natural material is how to fasten a tool member to the handle in a reliable manner.

SUMMARY OF THE INVENTION

An object of the present invention is thus to provide a hand tool and a manufacturing method for a hand tool so as to overcome at least some of the above problems. The objects of the invention are achieved by a hand tool and a manufacturing method for a hand tool which are characterized by what is stated in the independent claims. The preferred embodiments of the invention are disclosed in the dependent claims.

BRIEF DESCRIPTION OF THE DRAWINGS

In the following the invention will be described in detail by means of preferred embodiments with reference to the attached drawings, in which.

DESCRIPTION OF AT LEAST ONE EMBODIMENT

Figure 1:
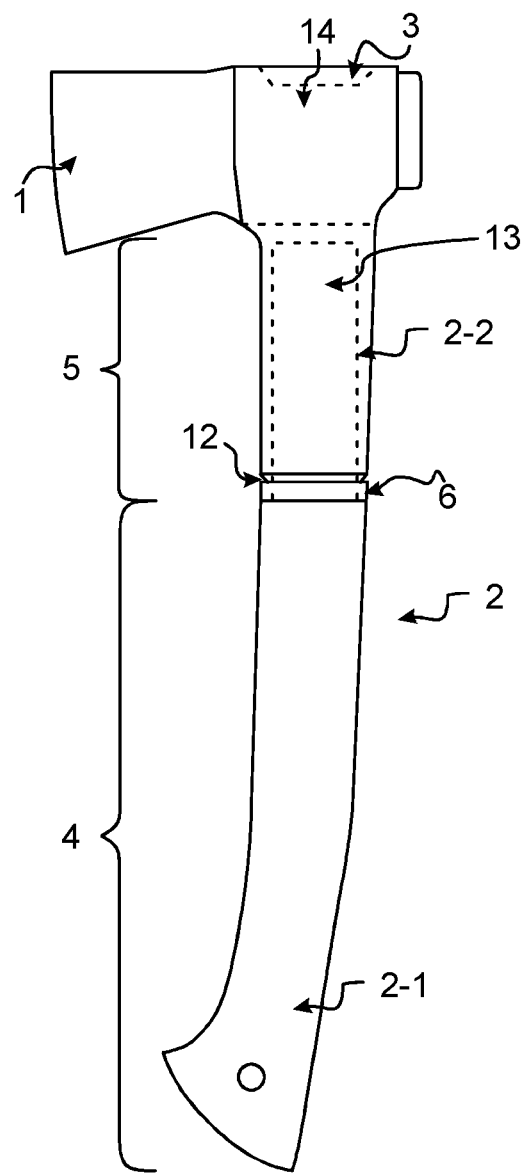
FIG. 1 is an overview drawing of a first embodiment of a hand tool.

FIG. 1 is an overview drawing of a first embodiment of a hand tool. The hand tool of FIG. 1 comprises a tool member 1, of a first material, an elongated shaft 2, of a second material and a connecting member 3, of a third material comprising plastic. The elongated shaft 2 further comprises a handle portion 4 in a first end 2-1 and an insert portion 5 in a second end 2-2. The connecting member 3 is arranged between the tool member 1 and the elongated shaft 2 for receiving the insert portion 5, of a second material, into a first recess 13 of the connecting member 3 and joining the tool member 1 and the elongated shaft 2.

The hand tool further comprises a sealing ring 6. The sealing ring 6 is arranged to surround the insert portion 5 such that the sealing ring 6 is contacting the insert portion 5 and the third material of the connecting member 3 to prevent leakage of the third material during manufacturing past the sealing ring 6 onto the material of the elongated shaft 2. Furthermore, the insert portion 5 and connecting member 3 fix the sealing ring 6 to the hand tool. The sealing ring 6 may be made of metal or plastic, for example.

The connecting member 3 advantageously receives a part of the tool member 1 into a second recess 14 of the connecting member 3. Alternatively, the first recess 13 and the second recess 14 of the connecting member 3 may be the same recess and the insert portion 5 of the elongated shaft 2 and the tool member 1 are received in different ends of said recess. In other words, the connecting member 3 may be hollow throughout, for example, and the connecting member 3 receives the tool member 1 and the elongated shaft 2 at different ends of the hollow section. Furthermore, the connecting member 3 may comprise a recess 12 in the vicinity of the sealing ring 6.

The elongated shaft 2 is preferably manufactured from a natural material, such as hickory, ash, cork or birch wood and ceramic materials are possible as well. The elongated shaft 2 may also be manufactured from other materials, such as plywood, steel, plastic, plastic with a soft grip or a composite material. Furthermore, in FIG. 1, the hand tool is illustrated as an axe, by example. However, a hand tool may be any hand tool, operated by hand and comprising a tool member and a handle, such as a kitchen knife, a fork, a hammer, a brush hook or a lopper. The first material of the tool member may be of metal, such as of steel, for instance.

Figure 2:
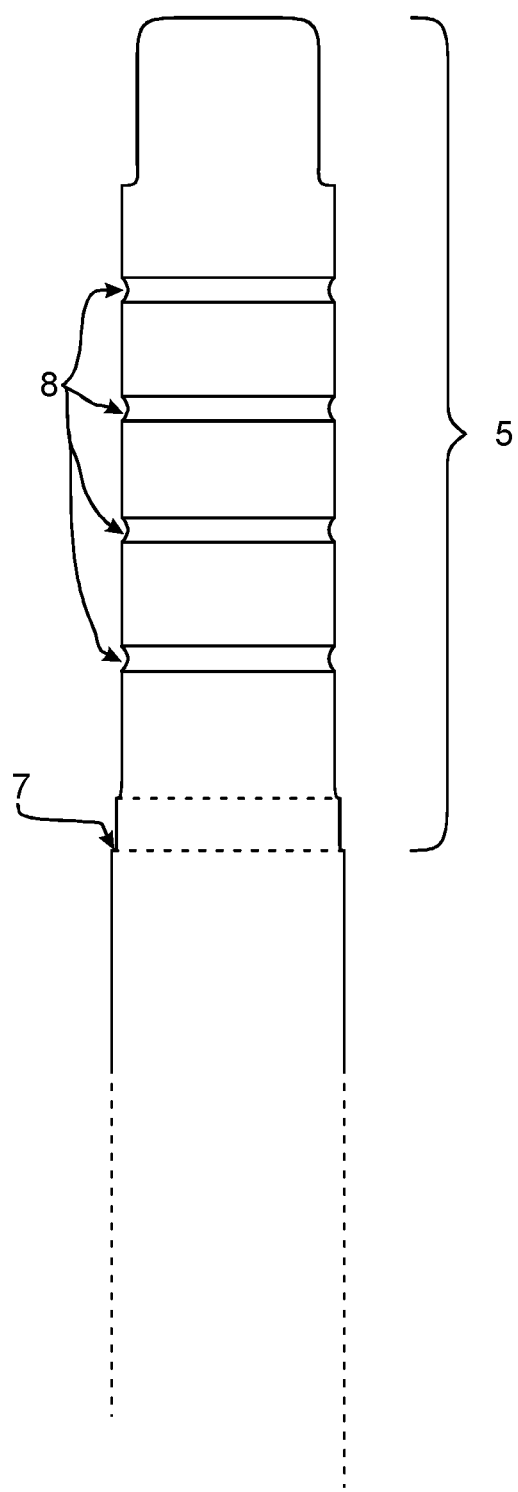
FIG. 2 is a drawing illustrating an insert portion of an elongated shaft of the hand tool.

FIG. 2 is a drawing illustrating an insert portion 5 of an elongated shaft 2 of the hand tool which may be utilized in the embodiment of FIG. 1. The insert portion 5 of the elongated shaft 2 comprises a step 7 for the sealing ring 6, such that the cross-sectional area of the elongated shaft 2 at the location of the sealing ring 6 is smaller than the cross-sectional area of the handle portion 4 of the elongated shaft 2, that is in immediate proximity to the sealing ring 6. The insert portion 5 of the elongated shaft 2 is preferably provided with a locking geometry, which may be for example at least one groove 8, for enhancing mechanical locking between the connecting member 3 and the elongated shaft 2. In FIG. 2, the insert portion 5 is provided with several of such grooves. Furthermore, the insert portion 5 of the elongated shaft 2 may be provided with at least one section having a different cross-sectional shape than the remaining insert portion. For instance, one section may have a rectangular cross-section whereas the remaining insert portion features an oval cross-section.

Figure 3:
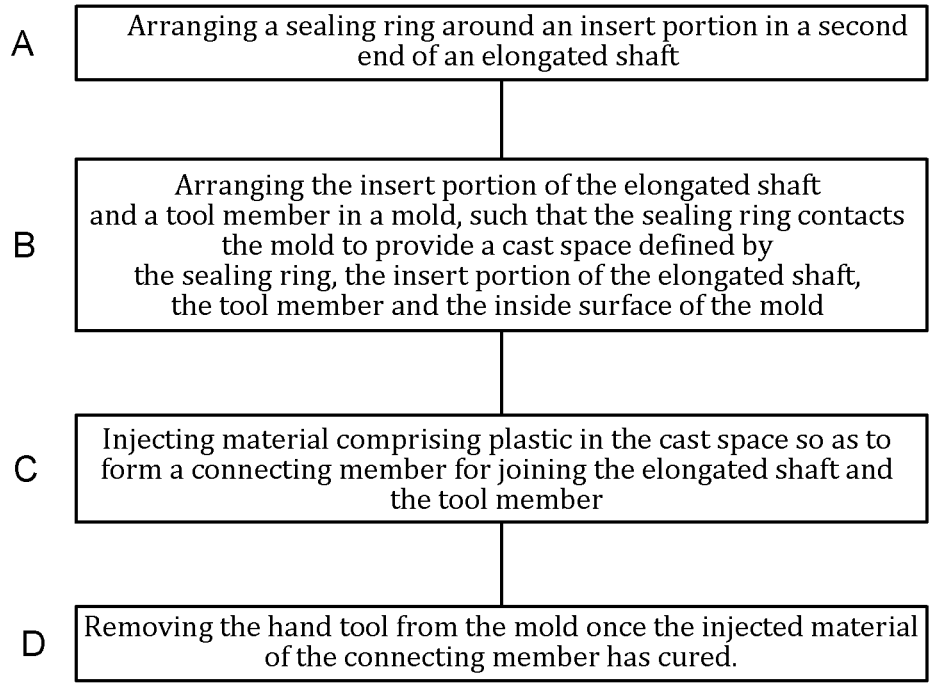
FIG. 3 is a block-diagram of a manufacturing method for a hand tool.

FIG. 3 is a block-diagram of a manufacturing method for a hand tool which may be utilized for manufacturing the hand tool of FIGS. 1 and 2. Said method comprises (A) arranging a sealing ring 6 around an insert portion 5 in a second end 2-2 of an elongated shaft 2 and (B) arranging the insert portion 5 of the elongated shaft 2 and a tool member 1 in a mold, such that the sealing ring 6 contacts the mold and the insert portion 5 to seal off a cavity space 9 defined by the sealing ring 6, the insert portion 5 of the elongated shaft 2, the tool member 1 and the inside surface of the wall of the mold 11. This is followed by (C) injecting material comprising plastic in the cavity space 9 so as to form a connecting member 3 for joining the elongated shaft 2 and the tool member 1, and finally (D) removing the hand tool from the mold once the injected material of the connecting member 3 has cured.

Figure 4:
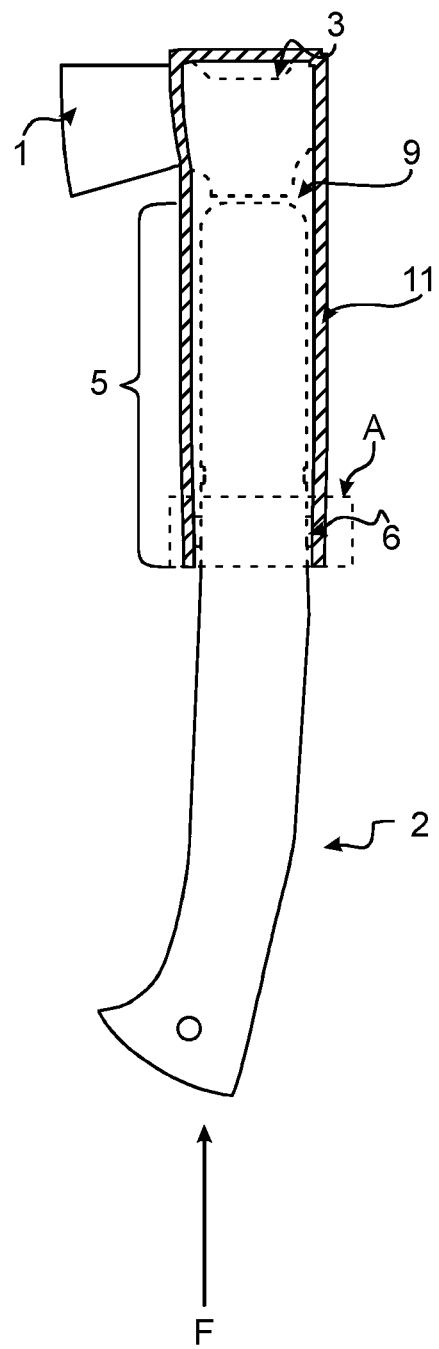
FIG. 4 is a drawing illustrating an example of an arrangement of a tool member, an elongated shaft and a sealing ring in a mold.

FIG. 4 is a drawing illustrating an example of an arrangement of a tool member 1, an elongated shaft 2 and a sealing ring 6 in a mold as part of the manufacturing method of FIG. 3. The cavity space 9 is also illustrated. The method may comprise providing said insert portion 5 with a step 7 for positioning the sealing ring 6. During manufacturing, the elongated shaft 2 may be supported in order to hold the elongated shaft 2 in place. In addition, the elongated shaft 2 may be pressed towards the mold with a force F. In the illustrated example, the force F presses the elongated shaft upwards. At that stage the sealing ring 6 and the tool member 1 are kept in place due to contact with the walls of the mold 11. No contact is needed between the elongated shaft 2 and the walls of the mold 11. Instead, the sealing ring is supported against the walls of the mold 11 and the elongated shaft 2 is supported against the sealing ring 6. In this way, direct contact between the walls of the mold 11 and the material of the elongated shaft 2, and the resulting permanent marks in the elongated shaft 2 due to contact with the mold, are avoided.

Furthermore, the manufacturing method may comprise providing the insert portion 5 of the elongated shaft 2 with a locking geometry. This locking geometry may be, for example, at least one transversal groove 8 for enhancing mechanical locking between the connecting member 3 and the elongated shaft 2. The locking geometry may also comprise a hole or a counterdraft, for example. The method may further comprise providing the insert portion 5 of the elongated shaft 2 with at least one section having a different cross-sectional shape than the remaining insert portion. In addition, the manufacturing method may also comprise providing an elongated shaft 2 comprising natural material, such as wood.

Figure 5:
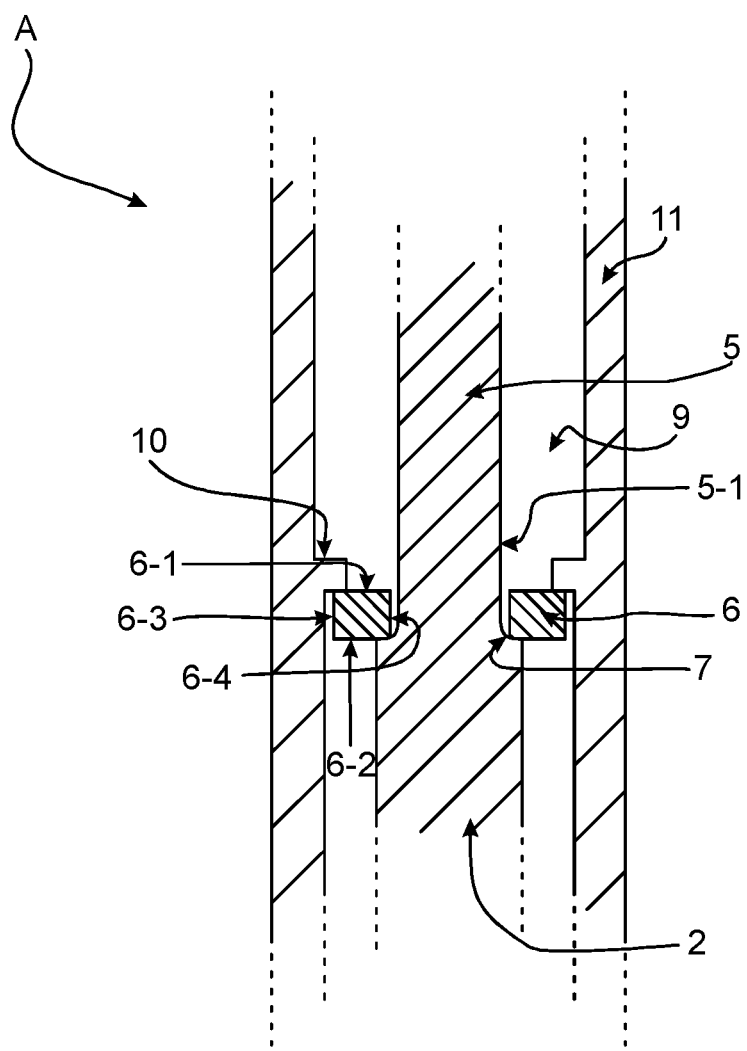
FIG. 5 is an enlarged drawing of an example of an arrangement of an elongated shaft and a sealing ring in a mold.

FIG. 5 is an enlarged drawing (cut-out A from FIG. 4) illustrating an arrangement example of an elongated shaft 2 and a sealing ring 6 in a mold which may be utilized for manufacturing a hand tool according to FIGS. 1 and 2. The features presented in FIG. 5 are not in scale and some features are exaggerated for sake of clarity.

FIG. 5 illustrates that the sealing ring 6 is arranged to surround the insert portion 5, such that, a first sealing side surface 6-1 of the sealing ring 6 is contacting the third material of the connecting member 3 and a protrusion 10, provided in the vicinity of the sealing ring 6 for engaging with the sealing ring 6 and protruding from the inside of the wall of the mold 11 towards the center of the cavity space. Furthermore, a second sealing side surface 6-2 of the sealing ring 6 is contacting the insert portion 5 at a location of the step 7, which step 7 is provided for positioning the sealing ring 6. Thus, the protrusion 10 of the wall of the mold and the step 7 of the insert portion 5 act as connecting points for the sealing ring 6. FIG. 5 further illustrates that a first gap may be provided between an outer surface 6-3 of the sealing ring 6 and the wall of the mold 11 and a second gap may be provided between an inner surface 6-4 of the sealing ring 6 and the insert portion 5 of the elongated shaft 2.

During manufacturing, the first sealing side surface 6-1 of the sealing ring 6 is in contact with the protrusion 10 of the wall of the mold 11 and a second sealing side surface 6-2 of the sealing ring 6 is in contact with the insert portion 5 to prevent leakage of the third material during manufacturing past the second sealing side surface 6-2 onto the material of the elongated shaft 2.

Natural material, such as wood, is frequently soft and susceptible to dimension variation due to changes in environment moisture content, for example. An advantage of using a sealing ring and providing said gaps is that larger tolerances are allowed in manufacturing a hand tool combining natural material and plastic, for example.

In FIG. 5, the protrusion 10 is arranged on the inside of the wall of the mold 11 such that the sealing ring 6 is pressed against the protrusion 10 during manufacturing of the hand tool. When the insert portion 5 of the elongated shaft 2, having the sealing ring 6 surrounding the insert portion 5, and the tool member 1 are arranged in the mold, and the mold is closed, said protrusion 10 is contacting the first sealing side surface 6-1 of the sealing ring 6 and the second sealing side surface 6-2 of the sealing ring 6 is contacting the step 7 of the insert portion 5.

The protrusion 10 is advantageous as it secures the sealing ring 6 in place and ensures that the sealing ring 6 does not move during injection step. Also in this embodiment, no contact is needed between the walls of the mold 11 and the material of the elongated shaft 2, which ensures that no permanent marks remain in the elongated shaft 2 or in the sealing ring due to the manufacturing process.

In the example of FIG. 5, a gap is provided between the outer surface 6-3 of the sealing ring 6 and the wall of the mold 11, and the inner surface 6-4 of the sealing ring 6 and the insert portion 5. In other words, the outer surface 6-3 and inner surface 6-4 of the sealing ring 6 are not in contact with the wall of the mold 11 and the insert portion, respectively. Alternatively, said outer surface 6-3 and/or inner surface 6-4 of the sealing ring 6 may be in contact with the wall of the mold 11 and the insert portion 5, respectively. In case the mold is pressed onto the outer surface 6-3 of the sealing ring and the inner surface 6-4 of the sealing ring 6 is in contact with the insert portion 5, it is not necessary to press the elongated shaft 2 towards the mold with a force F.

It will be obvious to a person skilled in the art that, as the technology advances, the inventive concept can be implemented in various ways. The invention and its embodiments are not limited to the examples described above but may vary within the scope of the claims.

The invention claimed is:
1. A hand tool, comprising
   a tool member, of a first material,
   an elongated shaft, of a second material, comprising a handle portion in a first end and an insert portion in a second end,
   a connecting member, of a third material comprising plastic, arranged between the tool member and the elongated shaft for receiving the insert portion into a first cavity of the connecting member, and receiving a part of the tool member into a different end of said cavity or into a second cavity of the connecting member, such that a top surface of the insert portion of the elongated shaft does not extend into or through a bottom surface of the tool member,
   a sealing ring contacting a step on the handle portion and arranged to surround the insert portion, wherein an interior surface of the sealing ring and an exterior surface of the insert portion are spaced apart, wherein the insert portion and connecting member fix the sealing ring to the hand tool,
   and wherein the elongated shaft comprises natural material.
2. The hand tool according to claim 1, wherein the insert portion of the elongated shaft comprises the step for the sealing ring, such that a cross-sectional area at a location of the sealing ring is smaller than a cross-sectional area of the handle portion of the elongated shaft that is in immediate proximity to the sealing ring.

3. The hand tool according to claim 1, wherein the insert portion of the elongated shaft comprises a step for the sealing ring, such that a cross-sectional area at a location of the sealing ring is smaller than a cross-sectional area of the handle portion of the elongated shaft that is in immediate proximity to the sealing ring.

4. The hand tool according to claim 1, wherein the insert portion of the elongated shaft is provided with a locking geometry for enhancing mechanical locking between the connecting member and the elongated shaft.

5. The hand tool according to claim 1, wherein the insert portion of the elongated shaft is provided with at least one section having a different cross-sectional shape than a portion of the insert portion.

6. The hand tool according to claim 1, wherein said natural material is wood.

7. The hand tool according to claim 1, wherein the first cavity and the second cavity of the connecting member are separate from and non-intersecting with each other, and define openings that are perpendicular to each other.

8. A manufacturing method for a hand tool, wherein said method comprises:

arranging a sealing ring around an insert portion in a second end of an elongated shaft, the sealing ring contacting a step on the insert portion and arranged to surround the insert portion with a gap formed between an interior of the sealing ring and an exterior of the insert portion, arranging the insert portion of the elongated shaft and a tool member in a mold, such that a top surface of the insert portion of the elongated shaft does not extend into or through a bottom surface of the tool member and such that the sealing ring contacts the mold and the insert portion to seal off a cavity space defined by the sealing ring, the insert portion of the elongated shaft, the tool member and an inside surface of wall of the mold, injecting material comprising plastic in the cavity space so as to form a connecting member for joining the elongated shaft and the tool member, and removing the hand tool from the mold once the injected material of the connecting member has cured.

9. The manufacturing method for a hand tool according to claim 8, wherein providing the insert portion of the elongated shaft with a locking geometry for enhancing mechanical locking between the connecting member and the elongated shaft.

10. The manufacturing method for a hand tool according to claim 8, wherein providing the insert portion of the elongated shaft with at least one section having a different cross-sectional shape than the remaining insert portion.

11. The manufacturing method for a hand tool according to claim 8, wherein providing a mold with a protrusion in the vicinity of the sealing ring for engaging with the sealing ring.

12. The manufacturing method for a hand tool according to claim 8, wherein the elongated shaft comprises natural material.

13. The manufacturing method for a hand tool according to claim 12, wherein said natural material is wood.

* * * * *